United States Patent [19]

Odagiri et al.

[11] Patent Number: 5,789,463
[45] Date of Patent: Aug. 4, 1998

[54] OCULAR LENS MATERIAL AND PROCESS FOR PRODUCING THE SAME

[75] Inventors: Kiyotaka Odagiri; Takuo Kato, both of Nagoya, Japan

[73] Assignee: Tomey Technology Corporation, Nagoya, Japan

[21] Appl. No.: 922,571

[22] Filed: Sep. 3, 1997

Related U.S. Application Data

[63] Continuation of Ser. No. 586,757, filed as PCT/JP95/01102 Jun. 5, 1995, abandoned.

[30] Foreign Application Priority Data

Jun. 7, 1994 [JP] Japan .................................. 6-125297

[51] Int. Cl.$^6$ .............................. G02C 7/04; C08F 265/04
[52] U.S. Cl. ................ 523/106; 351/160 R; 351/160 H; 524/529; 524/533; 524/552; 524/571; 525/310
[58] Field of Search ..................... 351/160 R; 523/106; 524/552, 571, 533, 529; 525/310

[56] References Cited

U.S. PATENT DOCUMENTS

| | | | |
|---|---|---|---|
| 4,699,946 | 10/1987 | Yanagihara et al. | 524/539 |
| 4,767,833 | 8/1988 | Yumoto et al. | 525/310 |
| 5,100,689 | 3/1992 | Goldberg et al. | 427/2 |
| 5,505,884 | 4/1996 | Burke et al. | 523/106 |

FOREIGN PATENT DOCUMENTS

| | | |
|---|---|---|
| 0 522 710 A1 | 1/1993 | European Pat. Off. . |
| 1127086 | 4/1962 | Germany ................ 525/310 |
| 62-11712 | 1/1987 | Japan . |
| 62-151415 | 7/1987 | Japan . |
| 5-97935 | 4/1993 | Japan . |

OTHER PUBLICATIONS

International Search Report dated Sep. 5, 1995; International Application No. PCT/JP95/01102 listing above cited references.

*Primary Examiner*—Andrew E. C. Merriam
*Attorney, Agent, or Firm*—Armstrong, Westerman, Hattori, McLeland & Naughton

[57] ABSTRACT

An ocular lens material comprising a copolymer obtained by copolymerizing a copolymerizable composition of which the main components are a diene polymer and a monomer capable of copolymerizing with the diene polymer, having high oxygen permeability, high refractive index and high mechanical strength, and being excellent in flexibility and shape recoverability, and its production process are disclosed.

10 Claims, No Drawings

OCULAR LENS MATERIAL AND PROCESS FOR PRODUCING THE SAME

This application is a continuation of application Ser. No. 08/586,757 filed Feb. 5, 1996, now abandoned, which is a § 371 national phase of international application PCT/JP95/01102 filed Jun. 5, 1995.

TECHNICAL FIELD

The present invention relates to an ocular lens material and a process for producing the same, and more particularly to an ocular lens material having high oxygen permeability, high refractive index and high mechanical strength, and excellent in flexibility and shape recoverability, which can be used in, for instance, ocular lenses such as soft contact lenses and intraocular lenses, and a process capable of producing the ocular lens material in a short period of time from cheap raw materials.

BACKGROUND ART

Conventionally, there have been known a hydrogel material whose main component is 2-hydroxyethyl methacrylate and a hydrogel material whose main component is N-vinylpyrrolidone as a material for soft contact lenses.

However, since the former is not sufficient for oxygen permeability, it is feared that the former exerts bad influences upon the metabolism of the cornea. Also, since the latter has a high water content, there is a defect in the latter that mechanical strength is insufficient. Also, since any of these are hydrogel materials, bacterias and the like easily proliferate in the lenses during their use. Therefore, there is a necessity to frequently carry out the sterilization by boiling, which also causes a defect that the burden on the care of a contact lens is increased.

On the other hand, as a non-hydrogel soft contact lens material, there have been known a non-hydrogel material whose main component is silicone rubber and a non-hydrogel material whose main component is acrylic acid ester.

The former has high oxygen permeability. However, since the silicone rubber itself shows hydrophobic property, there occurs a sensation of foreign matters when a contact lens made thereof is worn on the surface of cornea, and also there arises a defect that stains such as lipid contained in lacrimal fluid easily adhere to the contact lens. Also, in order to solve the defect of the non-hydrogel material whose main component is silicone rubber, there has been studied a material made of a combination of a silicone polymer with other monomer or other polymer. However, there is a defect that the silicon raw materials are generally expensive. Also, as the latter, i.e. the non-hydrogel material whose main component is acrylic acid ester, there has been proposed a non-hydrogel soft contact lens described in Japanese Unexamined Patent Publication No. 229113/1987. However, the material has a disadvantage of factory expenses such that esterification or transesterification must be carried out for a considerable long period of time after polymerization.

On the other hand, as an intraocular lens, a hard lens made of polymethyl methacrylate is mainly used. When the hard lens is inserted into an eye of a patient who is ill with cataract, there is a necessity to carry out the incision of his cornea widely.

However, when the incised portion for inserting the above-mentioned hard lens into an eye is wide, there occurs a problem that the patient is apt to suffer from troublesome astigmatism. Accordingly, since it is desired that the operation for inserting an intraocular lens into the eye of a patient who is ill with cataract is an operation for incising a small portion of the eye, it has been expected that an intraocular lens material which is excellent in flexibility and shape recoverability, and foldable and applicable to the operation for incising a small portion of the eye is developed.

The present invention has been accomplished in consideration of the above-mentioned prior art, and aims at providing an ocular lens material having high oxygen permeability and high mechanical strength and excellent in flexibility and shape recoverability, which can be suitably used in ocular lenses, particularly soft contact lenses, intraocular lenses and the like, and a process capable of producing the ocular lens material in a short period of time from cheap raw materials.

DISCLOSURE OF INVENTION

The present invention relates to ① an ocular lens material comprising a copolymer obtained by copolymerizing a copolymerizable composition whose main components are a diene polymer and a monomer capable of copolymerizing with the diene polymer, and ② a process for producing an ocular lens material characterized by mixing a diene polymer with a monomer capable of copolymerizing with the diene polymer and then copolymerizing the resulting copolymerizable composition when copolymerizing the copolymerizable composition whose main components are the diene polymer and the monomer capable of copolymerizing with the diene polymer.

BEST MODE FOR CARRYING OUT THE INVENTION

The ocular lens material of the present invention is composed of a copolymer obtained by copolymerizing a copolymerizable composition whose main components are a diene polymer and a monomer capable of copolymerizing with the diene polymer as aforementioned.

The diene polymer used in the present invention has been generally mass-produced, therefore, the diene polymer is very cheap and easily available.

As representative examples of the above-mentioned diene polymer, there can be cited, for instance, polybutadiene, polyisoprene, polychloroprene, styrene-butadiene copolymer, acrylonitrile-butadiene copolymer, isobutylene-isoprene copolymer, and the like. Among these diene polymers, polybutadiene, styrene-butadiene copolymer and isobutylene-isoprene copolymer can be particularly preferably used in the present invention from the viewpoint of the lowering of surface tackiness and the improvement of transparency of the ocular lens material.

It is desired that the number average molecular weight of the above-mentioned polybutadiene is at most 1000000, preferably at most 600000 in order to improve the compatibility with monomers to be polymerized, avoid hardening itself and improve its handling. Also, it is desired that the number average molecular weight of the polybutadiene is at least 500, preferably at least 1000, more preferably at least 3000 in order to avoid that the molecular weight of a molecular chain between crosslinked points of a resulting copolymer is lowered, improve mechanical strength and avoid that the copolymer becomes brittle after crosslinking.

In either case that the content of the cis-configuration in the above-mentioned polybutadiene is high or low, there is little differences in the properties of the ocular lens material.

Therefore, there is no limitation of the content of the cis-configuration in the polybutadiene. There are tendencies that the oxygen permeability of the ocular lens material increases and that its elongation percentage also increases in accordance with the increase of the content of the cis-configuration in the above-mentioned polybutadiene. Also, there is a tendency that the stability of the ocular lens material in water is improved in accordance with the lowering of the content of the cis-configuration.

Also, it is desired that the content of 1,2-configuration (the content of vinyl group) in the above-mentioned polybutadiene is at most 70% by weight, preferably at most 50% by weight in order to improve the flexibility of the ocular lens material. In particular, the 1,2-configuration may not be contained therein. Also, when at least two kinds of the above-mentioned polybutadiene are used by blending, if the blending ratio of the polybutadiene having the above-mentioned content of 1,2-configuration is at most 40% by weight of the total amount of the polybutadienes, there is no risk that oxygen permeability, mechanical strength, flexibility and the like of the ocular lens material are lowered even though the content of 1,2-configuration of other polybutadienes exceeds 70% by weight.

It is desired that the number-average molecular weight of the above-mentioned polyisoprene is at most 1000000, preferably at most 700000 in order to increase the compatibility with monomers to be polymerized, avoid hardening itself and improve its handling. Also, it is desired that the number average molecular weight of the polyisoprene is at least 1000, preferably at least 3000 in order to avoid that the molecular weight of a molecular chain between the crosslinked points of a resulting copolymer is lowered, improve mechanical strength and avoid that the copolymer becomes brittle after crosslinking.

There is no limitation of the content of the cis-configuration in the above-mentioned polyisoprene, but polyisoprene of which content of cis-configuration is 91 to 99% by weight, which is obtained by a usual polymerization method such as a solution polymerization method using, for instance, Ziegler catalyst, lithium catalyst or the like, is preferable because an ocular lens material having little differences in properties is obtained.

It is desired that the number average molecular weight of the above-mentioned polychloroprene is at most 1000000, preferably at most 600000 in order to improve the compatibility with monomers to be polymerized, avoid hardening itself and improve its handling. Also, it is desired that the number-average molecular weight of the polychloroprene is at least 1000, preferably at least 3000 in order to avoid that the molecular weight of a molecular chain between crosslinked points of a resulting copolymer is lowered, improve mechanical strength and avoid that the copolymer becomes brittle after crosslinking.

As the above-mentioned styrene-butadiene copolymer, there can be cited emulsion-polymerized styrene-butadiene copolymers and solution-polymerized styrene-butadiene copolymers. In the present invention, the emulsion-polymerized styrene-butadiene copolymer and the solution-polymerized styrene-butadiene copolymer may be used alone or in an admixture thereof. In any cases, there are little differences in the properties of an ocular lens material. Since a surface active agent and the like which are used during emulsion polymerization remain in the emulsion-polymerized styrene-butadiene copolymer as impurities by reason of its manufacturing process, the solution-polymerized styrene-butadiene copolymer is preferably used from the nature of the ocular lens material.

It is desired that the styrene content in the above-mentioned styrene-butadiene copolymer is at most 50% by weight, preferably at most 25% by weight in order to avoid that the oxygen permeability of the ocular lens material is lowered and that elongation and flexibility are lowered based upon the fact that rubber resiliency is lowered with the increase of the glass transition temperature of the styrene-butadiene copolymer itself.

It is desired that the number-average molecular weight of the above-mentioned styrene-butadiene copolymer is at most 1000000, preferably at most 600000 in order to improve the compatibility with monomers to be polymerized and also improve its handling without the lowering of the fluidity itself. Also, in order to avoid that the molecular weight of the molecular chain between crosslinked points of a resulting copolymer is lowered, increase mechanical strength and avoid that the copolymer becomes brittle after crosslinking, it is desired that the number-average molecular weight of the styrene-butadiene copolymer is at least 1000, preferably at least 3000.

It is desired that the number-average molecular weight of the above-mentioned acrylonitrile-butadiene copolymer is at most 1000000, preferably at most 600000 in order to improve the compatibility with monomers to be polymerized, avoid that the copolymer itself becomes hard and improve its handling. Also, it is desired that the number average molecular weight of the acrylonitrile-butadiene copolymer is at least 1000, preferably at least 3000 in order to avoid that the molecular weight of a molecular chain between crosslinked points of a resulting copolymer is lowered, improve mechanical strength and avoid that the copolymer becomes brittle after crosslinking.

Also, a hydrogel ocular lens material can be obtained by copolymerizing the above-mentioned acrylonitrile-butadiene copolymer with a hydrophilic monomer. In accordance with the increase of the acrylonitrile content in the acrylonitrile-butadiene copolymer, the compatibility of the acrylonitrile-butadiene copolymer with the hydrophilic monomer is improved, and the water-content of the ocular lens material also increases. Also, in accordance with the lowering of the acrylonitrile content, the compatibility of the acrylonitrile-butadiene copolymer with the hydrophilic monomer is lowered and the water-content of the ocular lens material is lowered. However, a material excellent in mechanical strength is obtained. Accordingly, in order to obtain an ocular lens material having a higher water content, it is preferable to use an acrylonitrile-butadiene copolymer having an acrylonitrile content of at least 43% by weight. Also, in order to obtain an ocular lens material having a higher mechanical strength, it is preferable to use an acrylonitrile-butadiene copolymer having an acrylonitrile content of at most 25% by weight. However, in order to obtain an ocular lens material having a good water-content based upon the good compatibility with a hydrophilic monomer, good oxygen permeability and suitable mechanical stength, it is preferable that the acrylonitrile content in the used acrylonitrile-butadiene copolymer is 15 to 50% by weight.

It is desired that the number-average molecular weight of the above-mentioned isobutylene-isoprene copolymer is at most 1000000, preferably at most 600000 in order to improve the compatibility with monomers to be polymerized, avoid the lowering its fluidity and improve its handling. Also, it is desired that the number average molecular weight of the isobutylene-isoprene copolymer is at least 1000, preferably at least 3000 in order to prevent the lowering of the molecular weight of a molecular chain between crosslinked points of a resulting polymer, improve mechanical strength and avoid that the copolymer becomes brittle after crosslinking.

Also, in the present invention, the above-mentioned various diene polymers may be used alone or in an admixture thereof.

It is desired that the content of the above-mentioned diene polymer in the copolymerizable composition is at least 10% by weight, preferably at least 30% by weight in order to lower the glass transition temperature of the copolymer constituting the ocular lens material, increase oxygen permeability and improve flexibility. Also, it is desired that the content of the diene polymer in the copolymerizable composition is at most 95% by weight, preferably at most 70% by weight in order to impart proper hydrophilic property to the ocular lens material.

As the monomer capable of copolymerizing with the above-mentioned diene polymer, there are cited, for instance, hydrophilic monomers, hydrophobic monomers, and the like.

The above-mentioned hydrophilic monomer is a component for imparting hydrophilic property to the ocular lens material.

Representative examples of the above-mentioned hydrophilic monomer are, for instance, (meth)acrylic acid; hydroxyalkyl (meth)acrylates such as 2-hydroxyethyl (meth)acrylate, 2-hydroxypropyl (meth)acrylate and 2-hydroxybutyl (meth)acrylate; (meth)acrylamide; N,N-dialkyl(meth)acrylamides such as N,N-dimethyl(meth)acrylamide; N-vinyllactams such as N-vinylpyrrolidone; alkyleneglycol mono(meth)acrylates such as ethyleneglycol mono(meth)acrylate, diethyleneglycol mono(meth)acrylate, triethyleneglycol mono(meth)acrylate and polyethyleneglycol mono(meth)acrylate; and the like, and these can be used alone or in an admixture thereof.

In the present specification, "(meth)acry" is intended to mean acry or methacry, and represents both of them as a general term.

When the above-mentioned hydrophilic monomer is used as the monomer capable of copolymerizing with the diene polymer, it is desired that the hydrophilic monomer is contained in the copolymerizable composition in a content of at least 5% by weight in order to impart desired hydrophilic property to the ocular lens material. Furthermore, in order to improve the fluidity of a mixture itself obtained by mixing the hydrophilic monomer with the diene polymer, lower tackiness and improve handling, it is more preferable that the hydrophilic monomer is contained in the copolymerizable composition in the content of at least 10% by weight. Also, it is preferable that the hydrophilic monomer is contained in the copolymerizable composition in a content of at most 90% by weight in order to impart proper flexibility to the ocular lens material. Furthermore, it is more preferable that the hydrophilic monomer is contained in the copolymerizable composition in a content of at most 70% by weight in order to improve oxygen permeability of the ocular lens material.

When a hydrogel ocular lens material is obtained by using the above-mentioned acrylonitrile-butadiene copolymer, it is desired that the hydrophilic monomer is contained in the copolymerizable composition in a content of at least 10% by weight in order to improve fluidity of a mixture itself obtained by mixing the hydrophilic monomer with the acrylonitrile-butadiene copolymer and improve moldability. Furthermore, it is more preferable that the hydrophilic monomer is contained in the copolymerizable composition in a content of at least 30% by weight in order to obtain a water content necessary for imparting a proper oxygen permeability to the ocular lens material. Also, when a hydrogel ocular lens material is obtained, it is desired that the hydrophilic monomer is contained in the copolymerizable composition in a content of at most 95% by weight in order to impart a proper mechanical strength to the ocular lens material. Moreover, it is more preferable that the hydrophilic monomer is contained in the copolymerizable composition in a content of at most 85% by weight in order to impart proper lens-shape stability (stiffness) to the ocular lens material.

Among the above-mentioned hydrophilic monomers, (meth)acrylic acid is excellent in compatibility with the diene polymer. Therefore, the (meth)acrylic acid can be solely used by adding to the diene polymer without the addition of a hydrophobic monomer showing a function as an agent which is dissolved together with the diene polymer to the diene polymer, and excellent hydrophilic property can be imparted to the ocular lens material.

Among the above-mentioned hydrophilic monomers, hydroxyalkyl (meth)acrylate, (meth)acrylamide, N,N-dialkyl(meth)acrylamide and alkyleneglycol mono(meth)acrylate are difficult to be uniformly mixed with the diene polymer. Therefore, when these hydrophilic monomers are used, it is desired that a hydrophobic monomer showing a function as an agent which is dissolved together with the diene polymer is added to the diene polymer. Also, since these hydrophilic monomers show high water-absorptive property, it is desired that the hydrophilic monomer is contained in the copolymerizable composition in a content of at most 30% by weight in order to avoid the risk that the ocular lens material becomes cloudy in water. Also, in order to impart better hydrophilic property to the ocular lens material, it is desired that these hydrophilic monomers are used together with (meth)acrylic acid.

The above-mentioned hydrophobic monomer is a component showing a function as an agent which is dissolved together with a hydrophilic monomer for imparting hydrophilic property to the ocular lens material and the diene polymer.

Representative examples of the above-mentioned hydrophobic monomer are, for instance, alkyl (meth)acrylates such as methyl (meth)acrylate, ethyl (meth)acrylate, propyl (meth)acrylate, i-propyl (meth)acrylate, n-butyl (meth) acrylate, t-butyl (meth)acrylate, n-hexyl (meth)acrylate, cyclohexyl (meth)acrylate, octyl (meth)acrylate, decyl (meth)acrylate, undecyl (meth)acrylate and lauryl (meth) acrylate; styrene compounds such as styrene and α-methylstyrene; vinyl esters such as vinyl acetate; and the like. These can be used alone or in an admixture thereof.

When the above-mentioned hydrophobic monomer is used, there are the following three standards of selection of the hydrophobic monomer.

The first standard of selection of the hydrophobic monomer is to improve the compatibility of the hydrophilic monomer for imparting hydrophilic property to the ocular lens material of the present invention with the diene polymer. From this viewpoint, as a desirable hydrophobic monomer, for instance, a monomer having polar groups in its molecule in a high content, such as methyl (meth) acrylate, ethyl (meth)acrylate or vinyl acetate can be cited. When these hydrophobic monomers are used, the hydrophilic property of the ocular lens material can be enhanced since the content of the hydrophilic monomer can be increased, and also productivity can be enhanced since the period of time for mixing the diene polymer with the hydrophilic monomer can be greatly shortened.

The second standard of selection of the hydrophobic monomer is that the glass transition temperature of a homopolymer obtained by homopolymerizing a hydrophobic monomer is low. As the hydrophobic monomer whose homopolymer shows a low glass transition temperature, for instance, linear alkyl (meth)acrylates and the like can be cited as preferably exemplified ones. When the hydrophobic monomer is used, the oxygen permeability of the ocular lens material can be more improved.

The third standard of selection of the hydrophobic monomer is to improve the mechanical strength such as tensile strength of the ocular lens material of the present invention. From this viewpoint, as desirable hydrophobic monomers, for instance, there are cited monomers having a hard segment in its molecule such as t-butyl (meth)acrylate, cyclohexyl (meth)acrylate, styrene and α-methylstyrene, and the like.

In the present invention, desirable physical properties can be imparted to an ocular lens material by selecting the hydrophobic monomer according to the above-mentioned first to third standards of selection of the hydrophobic monomer.

In consideration of the above-mentioned first to third standards of selection of the hydrophobic monomer, alkyl (meth)acrylates having a linear alkyl groups having 1 to 12 carbon atoms such as methyl (meth)acrylate, ethyl (meth) acrylate, propyl (meth)acrylate, n-butyl (meth)acrylate and n-hexyl (meth)acrylate, octyl (meth)acrylate are preferable among the above-mentioned hydrophobic monomers. Also, when the number of carbon atoms of the alkyl group is at least 13, there is a tendency that the tensile strength of the ocular lens material becomes small.

As aforementioned, when (meth)acrylic acid is used as a hydrophilic monomer, the diene polymer and (meth)acrylic acid can be uniformly mixed together. When a hydrophilic monomer other than (meth)acrylic acid is used, it is preferable that the hydrophobic monomer is added to the diene polymer.

The content of the above-mentioned hydrophobic monomer cannot be absolutely determined since the content differs depending upon kinds or content of the used hydrophilic monomer and the like. It is desired that the content of the hydrophobic monomer in the copolymerizable composition is at least 5% by weight, preferably at least 10% by weight in consideration of the compatibility of the diene polymer with the hydrophilic monomer. Also, it is desired that the content of the hydrophobic monomer in the copolymerizable composition is usually at most 85% by weight, preferably 70% by weight in order to impart hydrophilic property to the ocular lens material.

Moreover, a polyfunctional monomer and the like may be used together with the above-mentioned hydrophilic monomer and hydrophobic monomer in order to more improve optical properties and dynamic properties.

As representative examples of the above-mentioned polyfunctional monomer, there can be cited, for instance, polyfunctional (meth)acrylates such as di(meth)acrylates such as ethyleneglycol di(meth)acrylate, diethyleneglycol di(meth)acrylate, polyethyleneglycol di(meth)acrylate, propyleneglycol di(meth)acrylate, tripropyleneglycol di(meth)acrylate and polypropyleneglycol di(meth)acrylate, difunctional (meth)acrylates such as allyl (meth)acrylate, tri(meth) acrylates such as trimethylolpropane tri(meth)acrylate and tetramethylolmethane tri(meth)acrylate; monomers having at least 2 polymerizable double bonds in its molecule such as divinylbenzene, and the like. These can be used alone or in an admixture thereof.

Also, when the content of the diene polymer in the copolymerizable composition is small, the mechanical strength of the ocular lens material is sometimes lowered, which depends upon the nature of the used hydrophilic monomer and hydrophobic monomer. In such a case, it is desired that the content of the above-mentioned polyfunctional monomer in the copolymerizable composition is at least 0.01% by weight, preferably at least 0.05% by weight in order to improve the mechanical strength of the ocular lens material. Also, it is desired that the content of these polyfunctional monomers in the copolymerizable composition is at most 30% by weight, preferably at most 20% by weight, more preferably at most 15% by weight in order to avoid that the flexibility of the ocular lens material is imparted.

When a copolymer used in the ocular lens material of the present invention is prepared, first of all, the diene polymer is dissolved in or swollen by a monomer capable of copolymerizing with the diene polymer, and the polymer and the monomer are mixed together to give a uniform composition. When only (meth)acrylic acid is used as a hydrophilic monomer among the monomers capable of copolymerizing with the diene polymer, there is no necessity to dissolve or swell the diene polymer using the hydrophobic monomer, and the diene polymer can be merely mixed with (meth) acrylic acid. On the other hand, when hydrophilic monomers other than this (meth)acrylic acid are used, it is desired that the diene polymer be previously dissolved in or swollen by the hydrophobic monomer.

Next, when a hydrophilic monomer other than (meth) acrylic acid is used, the hydrophilic monomer is added to the thus dissolved or swollen diene polymer.

When the diene polymer is dissolved in or swollen by monomers capable of copolymerizing with the diene polymer, in case that the hydrophilic monomer is used together with the hydrophobic monomer at the same time, it takes a long period of time for dissolving or swelling the diene polymer with these monomers. Therefore, it is desired in the present invention that the diene polymer is previously dissolved in or swollen by the hydrophobic monomer.

When the above-mentioned copolymerizable composition is subjected to copolymerization, it is desired that a polymerization initiator from which a radical is generated by its thermal decomposition or a redox auxiliary is used. As the polymerization initiator, there can be cited, for instance, a radical polymerization initiator and the like.

As the above-mentioned radical polymerization initiator, there can be cited, for instance, organic peroxides such as benzoyl peroxide, t-butylcumyl peroxide, dicumyl peroxide and 1,3-bis(t-butylperoxyisopropyl)benzene; azo compounds such as azobisisobutyronitrile and azobisdimethylvaleronitrile, and the like. These can be used alone or in an admixture thereof.

The amount of the above-mentioned polymerization initiator is not particularly limited. It is desired that the amount of the polymerization initiator is usually 0.001 to 10 parts by weight based upon 100 parts by weight of the copolymerizable composition.

After the above-mentioned polymerization initiator is added to the copolymerizable composition, the resulting mixture is heated to a temperature in the vicinity of the decomposition temperature of the polymerization initiator or at least the decomposition temperature, and the copolymerization is completed to give an ocular lens material made of a resulting copolymer.

As a method for producing a contact lens from the ocular lens material of the present invention, there is cited, for instance, a method comprising pressing a mixture which is prepared by adding a polymerization initiator to the above-mentioned copolymerizale composition, into a mold for injection molding having a shape corresponding to a contact lens or injecting the mixture into a mold for a casting mold, and then heating the mixture to a prescribed temperature, a method comprising interposing the above-mentioned mixture between a convex mold and a concave mold, compressing and heating the mixture, and the like. The present invenion is not limited to those methods. As a method for producing an intraocular lens from the ocular lens material of the present invention, there are cited, for instance, the methods similar to the above-mentioned methods for producing a contact lens, and the like. When producing an intraocular lens, an optic portion and haptics can be molded at a time, or the optic portion and the haptics are separately molded and thereafter they can be united with each other in a body.

The characteristic of the method for producing the ocular lens material of the present invention also resides in that the ocular lens material can be produced in an extremely short period of time.

It is thought that the reason why the ocular lens material can be produced in the thus extremely short period of time according to the process of the present invenion is based upon that numerous unsaturated double bonds present in the diene polymer which is used as a main component in the present invention act as reaction points, and that the diene polymer is rapidly reacted with the monomer capable of polymerizing with the diene polymer at the unsaturated double bonds in the form of graft polymerization.

Accordingly, although it has hitherto taken a long period of time such as several tens of hours for polymerization to give an ocular lens material, according to the present invention, the copolymerization can be carried out in an extremely short period of time such as 5 seconds to 24 hours or so, which differs depending upon the kinds and amounts of the used polymerization initiator.

When benzoyl peroxide is for instance used as the above-mentioned polymerization initiator, the period of time needed for copolymerization becomes as extremely short as 30 seconds to 20 minutes or so. As an example, for instance, when 1 part by weight of benzoyl peroxide is added to 100 parts by weight of the copolymerizable composition, they are mixed together, thereafter the resulting mixture is poured into a mold, and the temperature of the mold is increased to 130° C. or so, an ocular lens material is obtained after about 2 to 3 minutes passed. Also, when the mold is previously preheated to, for instance, 70° to 80° C. or so, since the period of time for increasing the temperature of the mold to a predetermined temperature can be shortened, the period of time necessary for molding can be more shortened.

Also, for instance, when 1,3-bis(t-butylperoxyisopropyl) benzene is used as the polymerization initiator, an ocular lens material is obtained after about 2 to 4 minutes passed by adding 0.02 part by weight of 1,3-bis(t-butylperoxyisopropyl)benzene to 100 parts by weight of the copolymerizable composition, mixing them, pouring the resulting mixture into a mold and increasing the temperature of the mold to 180° C. or so. Also, when the mold is previously preheated to, for instance, 100° to 120° C. or so, since the period of time for increasing the temperature of the mold to a predetermined temperature can be shortend, the period of time necessary for molding can be more shortened.

Also, after the ocular lens material is formed into a prescribed shape of an ocular lens, a treatment using an alkaline solution may be applied to the ocular lens material in order to improve hydrophilic property of its lens surface.

The thus obtained ocular lens material of the present invention is excellent in flexibility and shape recoverability, and moreover has high mechanical strength, high oxygen permeability and high refractive index. Accordingly, since the thinning of an ocular lens at the central portion, which cannot have been carried out for conventional soft contact lenses from the viewpoint of mechanical strength, can be carried out, a soft contact lens having a more increased oxygen permeability can be obtained, and also there can be obtained, for instance, an intraocular lens which is foldable and applicable to an operation for a small incision.

Also, according to the process of the present invenion, since the aforementioned ocular lens material can be produced from cheap raw materials in a short period of time, its cost can be brought down and productivity can be improved.

Next, the ocular lens material and the process for producing the same of the present invention are more specifically explained on the basis of examples. However, the present invention is not limited to only the examples.

EXAMPLE 1

Fifty parts by weight of polybutadiene (number average molecular weight: 180000, content of 1,2-configuration: 1% by weight, made by Nippon Zeon Co., Ltd., BR 1220) and 35 parts by weight of n-hexyl methacrylate were mixed together with a stirring mixer (made by Custom Scientific Instruments, Inc., CS-183 MMX) at room temperature for 1 hour, and then 15 parts by weight of methacrylic acid and 1 part by weight of benzoylperoxide as a polymerization initiator were added thereto, followed by mixing them with a mixing stirrer at room temperature for 1 hour.

The resulting mixture was heated and compressed for polymerization at 130° C. for 3 minutes in a hot-press machine (made by TESTER SANGYO CO., LTD., SA3 03-II-S) to give a colorless and transparent film having a thickness of 0.2 mm.

In the present Example, a film having a thickness of 0.2 mm was molded. The reason why the film was molded is to measure the following physical properties. The fact that a film can be molded is intended to mean, in other words, that the ocular lens material can be molded into a contact lens and an intraocular lens. The same may be said of the following Examples.

Next, as physical properties of the obtained film, oxygen permeability, tensile strength, elongation percentage, refractive index, flexibility and shape recoverability were examined in accordance with the following methods. The results are shown in Table 1.

(A) Oxygen permeability

The oxygen permeability of a film having a thickness of 0.2 mm was measured in 0.9% saline with a Seikaken-type film oxygen-gas permeater.

(B) Tensile strength and elongation percentage

A test piece was produced by stamping out from a film having a thickness of 0.2 mm by means of a tensile and compression tester (mady by IMADA SEISAKUSHO CO., LTD., SV-201). The load when the test piece was broken and the length when the test piece was broken were measured at room temperature (23° C.) at a tensile speed of 10 mm/minute, and tensile strength and elongation percentage thereof were calculated in accordance with the following equations, respectively. The tensile strength prescribed herein is intended to mean tensile strength at breaking, and the elongation percentage is intended to mean elongation percentage at breaking by tension.

$$\text{Tensile strength } (gf/mm^2) = \frac{\text{Load at breaking } (gf)}{\text{Minimum area at the section of original test piece } (mm^2)}$$

Elongation percentage (%) =

$$\frac{\text{Length at breaking of test piece (mm)} - \text{Length of original test piece (mm)}}{\text{Length of original test piece (mm)}} \times 100$$

(C) Refractive index

The refractive index of a film having a thickness of 0.2 mm was measured at 20C by means of an Abbe's refractometer (made by ATAGO CO., LTD.).

(D) Flexibility

A circular test piece having a diameter of 6 mm was produced by stamping out from a film having a thickness of 0.2 mm, and the test piece was placed on a flat stand. One end of the test piece was held with a tweezer and folded in two at the central portion. At that time, the state of the test piece was observed with naked eyes, and evaluated in accordance with the following criteria for evaluation.

(Criteria for evaluation)

A: It is possible to fold the test piece until both ends of the test piece are touched with each other, and no crease remains in the test piece after folding.

B: It is impossible to fold the test piece until both ends of the test piece are touched with each other. However, the bending angle is at least 90° and no crease remains in the test piece after folding.

C: It is possible to fold the test piece until both ends of the test piece are touched with each other. However, crease remains in the test piece after folding, or the bending angle is less than 90°, or a crack is generated on the crease when the test piece is folded.

When the evaluation for flexibility is A, it is recognized that the test piece has flexibility needed for, in particular, intraocular lenses.

(E) Shape recoverability

After one end of the test piece was held with a tweezer and folded in two at the central position in the same manner as in the above-mentioned (D) Flexibility, the tweezer which has held the test piece was released from the test piece. There was measured a period of time from the release of the tweezer from the test piece, to the recovery of the test piece which has been folded in two to the original even state, and shape recoverability was evaluated in accordance with the following criteria for evaluation.

(Criteria for evaluation)

A: The period of time is less than 1 minute.

B: The period of time is at least 1 minute and less than 2 minutes.

C: The period of time is at least 2 minutes and less than 5 minutes.

D: The period of time is at least 5 minutes.

EXAMPLES 2 TO 17

A colorless and transparent film having a thickness of 0.2 mm was obtained in the same manner as in Example 1 except that the components for the copolymerizable composition used in Example 1 were changed to those shown in Table 1.

The physical properties of an obtained film were examined in the same manner as in Example 1. The results are shown in Table 1.

EXAMPLES 18 TO 22

A colorless and transparent film having a thickness of 0.2 mm was obtained in the same manner as in Example 1 except that the components for the copolymerizable composition were changed to those shown in Table 1, that 0.2 part by weight of 1,3-bis(t-butylperoxyisopropyl)benzene was used instead of 1 part by weight of benzoylperoxide as a polymerization initiator and that a resulting mixture was heated and compressed for polymerization at 170° C. for 4 minutes in Example 1.

The physical properties of an obtained film were examined in the same manner as in Example 1. The results are shown in Table 1.

Each code shown in Table 1 is intended to mean the following.

(Diene polymer)

BR 1: Polybutadiene (number average molecular weight: 180000, content of 1,2-configuration: 1% by weight, made by Nippon Zeon Co., Ltd., BR1220)

BR 2: Polybutadiene (number average molecular weight: 170000, content of 1,2-configuration: 10% by weight, made by Nippon Zeon Co., Ltd., BR1241N)

BR 3: Polybutadiene (number average molecular weight: 2000, content of 1,2-configuration: 64% by weight, made by NIPPON OIL COMPANY, LTD., B-2000)

IR: Polyisoprene (number average molecular weight: 530000, cis configuration content: 98% by weight, made by Nippon Zeon Co., Ltd., IR2205)

SBR: Styrene-butadiene copolymer (number average molecular weight: 140000, styrene content: 19.5% by weight, made by Nippon Zeon Co., Ltd., NS218)

(Monomer capable of copolymerizing with diene polymer)

MAc: Methacrylic acid

HEMA: 2-Hydroxyethyl methacrylate

DMAA: N, N-Dimethylacrylamide

NVP: N-Vinylpyrrolidone

MMA: Methyl methacrylate nBuMA: n-Butyl methacrylate nHMA: n-Hexyl methacrylate

CyHMA: Cyclohexyl methacrylate

LMA: Lauryl methacrylate

AMA: Allyl methacrylate

EDMA: Ehtyleneglycol dimethacrylate

TABLE 1

| | | Physical properties of film | | | | | |
|---|---|---|---|---|---|---|---|
| Ex. No. | Components of copolymerizable composition (parts by weight) | Oxygen permeability ($cm^3 \cdot cm/$ $(sec \cdot cm^2 \cdot mmHg)$) | Tensile strength ($gf/mm^2$) | Elongation percentage (%) | Refractive index (−) | Flexibility | Shape recoverability |
| 1 | BR1(50),nHMA(35),MAc(15) | $35 \times 10^{-11}$ | 1152 | 380 | 1.5154 | A | A |
| 2 | BR2(40),MAc(60) | $20 \times 10^{-11}$ | 674 | 210 | 1.5098 | A | B |
| 3 | BR2(50),LMA(35),MAc(15) | $38 \times 10^{-11}$ | 667 | 258 | 1.5158 | A | A |
| 4 | BR1(40),nHMA(45),MAc(15) | $28 \times 10^{-11}$ | 1296 | 287 | 1.5126 | A | A |
| 5 | BR1(60),nHMA(25),MAc(15) | $37 \times 10^{-11}$ | 1158 | 407 | 1.5192 | A | A |
| 6 | IR(50),nHMA(35),MAc(15) | $21 \times 10^{-11}$ | 933 | 412 | 1.5146 | A | A |
| 7 | IR(60),nHMA(25),MAc(15) | $22 \times 10^{-11}$ | 831 | 532 | 1.5196 | A | A |
| 8 | BR2(40),nHMA(45),MAc(15) | $27 \times 10^{-11}$ | 1111 | 217 | 1.5120 | A | A |
| 9 | BR2(50),nHMA(35),MAc(15) | $31 \times 10^{-11}$ | 1126 | 235 | 1.5148 | A | A |
| 10 | BR2(60),nHMA(25),MAc(15) | $34 \times 10^{-11}$ | 866 | 274 | 1.5187 | A | A |
| 11 | BR2(50),nHMA(30),CyHMA(15), HEMA(5) | $30 \times 10^{-11}$ | 512 | 372 | 1.5194 | A | A |
| 12 | SBR(60),nHMA(25),MAc(15) | $21 \times 10^{-11}$ | 954 | 314 | 1.5238 | A | A |
| 13 | BR1(50),MMA(35),MAc(15) | $31 \times 10^{-11}$ | 1237 | 430 | 1.5143 | A | A |
| 14 | BR1(50),nBuMA(35),MAc(15) | $40 \times 10^{-11}$ | 1255 | 333 | 1.5148 | A | A |
| 15 | BR1(50),LMA(35),MAc(15) | $34 \times 10^{-11}$ | 526 | 345 | 1.5150 | A | A |
| 16 | BR2(50),MMA(35),MAc(15) | $25 \times 10^{-11}$ | 979 | 317 | 1.5144 | A | A |
| 17 | BR2(50),nBuMA(35),MAc(15) | $26 \times 10^{-11}$ | 1242 | 252 | 1.5147 | A | A |
| 18 | BR2(45),MMA(35),MAc(20) | $27 \times 10^{-11}$ | 1222 | 311 | 1.5140 | A | A |
| 19 | BR2(45),MMA(22),MAc(15), AMA(10),EDMA(6),DMAA(2) | $27 \times 10^{-11}$ | 1669 | 211 | 1.5145 | A | A |
| 20 | BR2(45),MMA(22),MAc(15), AMA(10),EDMA(6),NVP(2) | $29 \times 10^{-11}$ | 1820 | 228 | 1.5146 | A | A |
| 21 | BR2(40),BR3(10),MMA(27), MAc(23) | $27 \times 10^{-11}$ | 920 | 262 | 1.5148 | A | A |
| 22 | BR2(40),BR3(10),MMA(19), MAc(15),AMA(10),EDMA(6) | $26 \times 10^{-11}$ | 1275 | 232 | 1.5150 | A | A |

From the results shown in Table 1, it can be seen that all of the films obtained in Examples 1 to 22 show high tensile strength and high elongation percentage, are excellent in flexibility and shape recoverability, and furthermore have a high refractive index of at least 1.51 or so.

Moreover, as is clear from the comparison of the films obtained in Examples 1 to 18 with the films obtained in Examples 19 to 20, and the comparison of the films obtained in Example 21 with the film obtained in Example 22, it can be seen that a film having a higher tensile strength can be obtained when a polyfunctional monomer is employed as Examples 19 to 20 and Example 22.

Then, using the films obtained in Examples 18 and 22, an elution test was carried out in accordance with "(3) Extract by water, E. Testing method for titrating potassium permanganate-reducible substance" prescribed in the item of "III. 6 Elution test" described in "the Approval Standards for Intraocular lenses" from. Notice No. 489 of the Pharmaceutical Affairs Bureau, dated 10 May, 1985. After each film was subjected to a boiling treatment for 30 minutes with distilled water, the amount of potassium permanganate consumed in the treated water was measured. As a result, as to the film obtained in Example 18, the difference between the amount of potassium permanganate consumed in the treated water after the boiling treatment of the film with distilled water for 30 minutes and the amount of potassium permanganate consumed in the distilled water before the treatment was 0.27 ml, and as to the film obtained in Example 22, the above difference between both was 0.77 ml. When the difference between both is at most 1.0 ml, the film satisfy the acceptable standard of the above-mentioned elution test.

Accordingly, the films obtained in Examples 18 and 22 satisfy the above-mentioned acceptable standard, and therefore, it can be seen that the films are excellent in stability in water.

EXAMPLE 23

A colorless and transparent film having a thickness of 0.2 mm was obtained in the same manner as in Example 1 except that the components of the copolymerizable composition were changed to those shown in Table 2.

The obtained film was subjected to a hydrating and swelling treatment, and oxygen permeability and water content of the film to which the hydrating and swelling treatment was subjected were measured. The results are shown in Table 2.

Each code shown in Table 2 is intended to mean the following.

NBR: Acrylonitrile-butadiene copolymer (number average molecular weight: 470000, acrylonitrile content: 33.5% by weight, made by Nippon Zeon Co., Ltd., DN200)

HEMA: 2-Hydroxyethyl methacrylate

DMAA: N, N-dimethylacrylamide

EDMA: Ethyleneglycol dimethacrylate

Also, oxygen permeability was measured in the same manner as in Example 1, and water content was calculated based on the following equation.

TABLE 2

| Ex. No. | Components of copolymerizable composition (parts by weight) | Oxygen permeability ($cm^3 \cdot cm/(sec \cdot cm^2 \cdot mmHg)$) | Water content (% by weight) |
|---|---|---|---|
| 23 | NBR(20),HEMA(38), DMAA(40),EDMA(2) | $21 \times 10^{-11}$ | 52 |

TABLE 2

| Ex. No. | Components of copolymerizable composition (parts by weight) | Oxygen permeability ($cm^3 \cdot cm/(sec \cdot cm^2 \cdot mmHg)$) | Water content (% by weight) |
|---|---|---|---|
| | NBR(20), HEMA(38), DMAA(40), EDMA(2) | $21 \times 10^{-11}$ | 52 |

From the results shown in Table 2, it can be seen that the film obtained in Example 23 has a high oxygen permeability and a high water content.

EXAMPLE 24

As a polymerization initiator, 1 part by weight of benzoylperoxide was added to a copolymerizable composition having the same components as in Example 17, and these were mixed together in the same manner as in Example 17 with a stirring mixer.

After the obtained mixture was poured into a mold for contact lenses made of stainless steel, the mold for contact lenses was set up in the same hot-press machine as used in Example 1, which was previously preheated to 130° C.

After the mold for contact lenses set up in the hot-press machine was heated for 4 minutes under a pressure of 50 kg/cm$^2$, the mold for contact lenses was taken out from the hot-press machine and allowed to cool. Then, the mold for contact lenses was opened, and a molded contact lens was taken out from the mold.

The obtained contact lens had a thickness of 0.07 mm in center and a base curve of 8.40 mm, was transparent, and had elasticity. Also, the contact lens had excellent physical properties similar to the film obtained in Example 17.

EXAMPLE 25

As a polymerization initiator, 0.2 part by weight of 1,3-bis(t-butylperoxyisopropyl)benzene was added to a copolymerizable composition having the same components as in Example 19, and these were mixed together in the same manner as in Example 19 with a stirring mixer.

After the obtained mixture was poured into a mold for intraocular lenses (optic portion) made of stainless steel, the mold for intraocular lenses was set up in the same hot-press machine as used in Example 1, which was previously preheated to 180° C.

Then, after the mold for intraocular lenses set up in the hot-press machine was heated for 4 minutes under a pressure of 60 kg/cm$^2$, the mold for intraocular lenses was taken out from the hot-press machine and allowed to cool. Then, the mold for intraocular lenses was opened, and a molded optic portion of an intraocular lens was taken out from the mold.

The obtained optic portion of the intraocular lens had a thickness of 0.7 mm in center and a diameter of 6.0 mm, was transparent and had flexibility. Also, the optic portion had excellent physical properties similar to the film obtained in Example 19, and was foldable.

Next, loops made of polypropylene as haptics were jointed with the obtained optic portion with the aid of a cyanoacrylate-type adhesive agent to give an intraocular lens.

EXAMPLE 26

As a polymerization initiator, 0.2 part by weight of 1,3-bis(t-butylperoxyisopropyl)benzene was added to a copolymerizable composition having the same components as in Example 19, and these were mixed together in the same manner as in Example 19 with a stirring mixer.

After the obtained mixture was poured into a mold for one-piece intraocular lenses made of stainless steel, the mold for intraocular lenses was set up in the same hot-press machine as used in Example 1, which was previously preheated to 180° C.

Then, after the mold for intraocular lenses set up in the hot-press machine was heated for 4 minutes under a pressure of 60 kg/cm$^2$, the mold for intraocular lenses was taken out from the hot-press machine and allowed to cool. Then, the mold for intraocular lenses was opened, and a molded one-piece intraocular lens was taken out from the mold.

The obtained one-piece intraocular lens had a thickness of 0.7 mm in center and a diameter of 6.0 mm in its optic portion, and a total length including haptics of 13.0 mm, was transparent, and had flexibility. Also, the intraocular lens had excellent physical properties similar to the film obtained in Example 19, and was foldable.

INDUSTRIAL APPLICABILITY

The ocular lens material of the present invention is excellent in flexibility and shape recoverability and extremely high in mechanical strength, and had a high oxygen permeability and a high refractive index. Accordingly, for instance, contact lenses such as soft contact lenses having a very thin thickness in the center can be obtained, and the obtained contact lenses are more excellent in oxygen permeability in addition to high oxygen permeability based upon its lens material. Also, since the ocular lens material of the present invention is excellent in, particularly, flexibility and shape recoverability, for instance, intraocular lenses which are foldable and applicable to an operation for incising a small portion can be obtained from the ocular lens material.

Also, in the process for producing an ocular lens material of the present invention, much cheaper raw materials are used in comparison with conventional ocular lens materials, and the process is very simple for producing a needed lens in a short period of time. Accordingly, according to the process, an ocular lens material having the aforementioned excellent physical properties can be easily produced, and moreover lowering of costs and improvement of productivity are achieved.

We claim:

1. An ocular lens comprising a copolymer produced by mixing a diene polymer with a monomer component capable of copolymerizing with the diene polymer and a polymerization initiator, and copolymerizing and molding at a temperature at or near the decomposition temperature of the polymerization initiator the resulting the copolymerizable composition of which the main components are the diene polymer and the monomer component at the same time in a mold, wherein said diene polymer is at least one member selected from the group consisting of polybutadiene having a content of 1,2-configuration of at most 70% by weight, polyisoprene, polychloroprene, styrene-butadiene copolymer, acrylonitrile-butadiene copolymer and isobutylene-isoprene copolymer, and wherein said monomer component capable of copolymerizing with the diene polymer contains a hydrophilic monomer, and said copolymerizable composition forms a flexible film when copolymerized, said flexible film having a flexibility such that a circular test piece of the film which has a diameter of 6 mm and a thickness of 0.2 mm can be folded in two at the central portion of the test piece until opposite ends of the test piece touch each other without a crease remaining in the test piece after said folding.

2. The ocular lens of claim 1, wherein said copolymerizable composition contains 10 to 95% by weight of the diene polymer.

3. The ocular lens of claim 1, wherein the content of the hydrophilic monomer in the copolymerizable composition is 5 to 90% by weight.

4. The ocular lens of claim 1, wherein said hydrophilic monomer is at least one member seleted from the group consisting of (meth)acrylic acid, hydroxyalkyl (meth) acrylate, (meth)acrylamide, N,N-dialkyl(meth)acrylamide, N-vinyllactam and alkyleneglycol mono(meth)acrylate.

5. The ocular lens of claim 1, wherein said monomer capable of copolymerizing with the diene polymer contains a hydrophobic monomer.

6. The ocular lens of claim 1, wherein the content of the hydrophobic monomer in the copolymerizable composition is at most 85% by weight.

7. The ocular lens of claim 1, wherein said hydrophobic monomer is at least one member selected from the group consisting of alkyl (meth)acrylate, a styrene compound and vinyl ester.

8. A process for producing an ocular lens comprising mixing a diene polymer with a monomer component capable of copolymerizing with the diene polymer and a polymerization initiator and then copolymerizing and molding at a temperature at or near the decomposition temperature of the polymerization initiator the resulting copolymerizable composition of which the main components are the diene polymer and the monomer component capable of copolymerizing with the diene polymer at the same time in a mold, wherein said diene polymer is at least one member selected from the group consisting of polybutadiene having a content of 1,2-configuration of at most 70% by weight, polyisoprene, polychloroprene, styrene-butadiene copolymer, acrylonitrile-butadiene copolymer and isobutylene-isoprene copolymer, said monomer component capable of copolymerizing with the diene polymer contains a hydrophilic monomer, and said copolymerizable composition forms a flexible film when copolymerized, said flexible film having a flexibility such that a circular test piece of the film which has a diameter of 6 mm and a thickness of 0.2 mm can be folded in two at the central portion of the test piece until opposite ends of the test piece touch each other with a crease remaining in the test piece after said folding.

9. The ocular lens of claim 1, wherein said copolymerizable composition is a uniform composition and is obtained by dissolving the diene polymer in the monomer component or by allowing the monomer component to cause swelling of the diene polymer.

10. The process of claim 8, wherein the diene polymer is mixed with the monomer component by dissolving the diene polymer in the monomer component or by allowing the monomer component to cause swelling of the diene polymer to give a uniform copolymerizable composition.

* * * * *